US009024966B2

(12) United States Patent
Meulen

(10) Patent No.: US 9,024,966 B2
(45) Date of Patent: May 5, 2015

(54) VIDEO BLENDING USING TIME-AVERAGED COLOR KEYS

(75) Inventor: Pieter van der Meulen, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1437 days.

(21) Appl. No.: 11/852,187

(22) Filed: Sep. 7, 2007

(65) Prior Publication Data

US 2009/0066716 A1 Mar. 12, 2009

(51) Int. Cl.
*G09G 5/00* (2006.01)
*G09G 5/14* (2006.01)
*G09G 5/02* (2006.01)
*G09G 3/20* (2006.01)
*H04N 9/75* (2006.01)

(52) U.S. Cl.
CPC ............ *G09G 5/14* (2013.01); *G09G 5/026* (2013.01); *G09G 3/2051* (2013.01); *H04N 9/75* (2013.01); *G09G 3/2055* (2013.01); *G09G 5/02* (2013.01); *G09G 3/2044* (2013.01); *G09G 2340/12* (2013.01)

(58) Field of Classification Search
CPC ............ G09G 2340/12; G09G 3/2044; G09G 3/2051; G09G 3/2055; G09G 5/14; G09G 5/026; G09G 5/02; H04N 9/75
USPC ............ 345/629, 589, 597; 348/E9.056, 586; 358/3.13
See application file for complete search history.

(56) References Cited

U.S. PATENT DOCUMENTS

| | | | |
|---|---|---|---|
| 5,719,593 A | 2/1998 | De Lange | |
| 5,790,124 A * | 8/1998 | Fischer et al. | 345/629 |
| 5,889,499 A * | 3/1999 | Nally et al. | 345/7 |
| 6,023,302 A | 2/2000 | MacInnis et al. | |
| 6,151,030 A | 11/2000 | DeLeeuw et al. | |
| 6,335,765 B1 * | 1/2002 | Daly et al. | 348/586 |
| 6,844,882 B1 * | 1/2005 | Clauson | 345/596 |
| 7,006,155 B1 * | 2/2006 | Agarwala et al. | 348/592 |
| 7,623,140 B1 * | 11/2009 | Yeh et al. | 345/629 |
| 2002/0196369 A1 | 12/2002 | Rieder et al. | |
| 2003/0016231 A1 * | 1/2003 | Hei La | 345/596 |
| 2003/0189571 A1 * | 10/2003 | MacInnis et al. | 345/505 |
| 2004/0017383 A1 * | 1/2004 | Baer et al. | 345/629 |
| 2004/0194128 A1 * | 9/2004 | McIntyre et al. | 725/32 |
| 2005/0012759 A1 * | 1/2005 | Valmiki et al. | 345/629 |
| 2005/0068463 A1 * | 3/2005 | Feng et al. | 348/574 |
| 2005/0093856 A1 * | 5/2005 | Borgsmuller et al. | 345/418 |
| 2005/0117805 A1 | 6/2005 | Poutet et al. | |
| 2005/0174360 A1 * | 8/2005 | Daly et al. | 345/596 |

(Continued)

OTHER PUBLICATIONS

PCT International Search Report and Written Opinion, PCT/US08/72654, Nov. 14, 2008, 8 pages.

(Continued)

*Primary Examiner* — Jin-Cheng Wang
(74) *Attorney, Agent, or Firm* — Norton Rose Fulbright US LLP

(57) ABSTRACT

A display system combines a graphic plane and a video overlay plane using color keys in the graphics plane. By time-averaging patterns of color keys in successive frames of the graphics plane, individual pixels of the graphics plane can be made to appear partially transparent. Using this technique, regions in the graphics plane (e.g., a menu) can be partially transparent with respect to the video overlay, and aliasing can be reduced by making selected pixels in the graphics plane partially transparent.

16 Claims, 3 Drawing Sheets

(56) References Cited

U.S. PATENT DOCUMENTS

| | | | |
|---|---|---|---|
| 2005/0185001 A1* | 8/2005 | Feng et al. | 345/597 |
| 2006/0221401 A1* | 10/2006 | Daly et al. | 358/3.13 |
| 2006/0244764 A1* | 11/2006 | Ahmad | 345/629 |
| 2006/0268012 A1* | 11/2006 | MacInnis et al. | 345/629 |
| 2007/0103489 A1 | 5/2007 | MacInnis et al. | |
| 2008/0284798 A1* | 11/2008 | Weybrew et al. | 345/630 |
| 2009/0033680 A1* | 2/2009 | Lee et al. | 345/629 |
| 2009/0129592 A1* | 5/2009 | Swiegers et al. | 380/54 |

OTHER PUBLICATIONS

Kasai N., et al., "26.4L: Late-News Paper: Development of 13.3-IN. Super TFT-LCD Monitor", SID International Symposium. Digest of Technical Papers, San Diego, May 12-17, 1996, Santa Ana SID, US, vol. 27. May 12, 1996, pp. 414-417, XP000621050.

Supplementary European Search Report—EP08829786—Search Authority—Munich—Dec. 17, 2010.

* cited by examiner

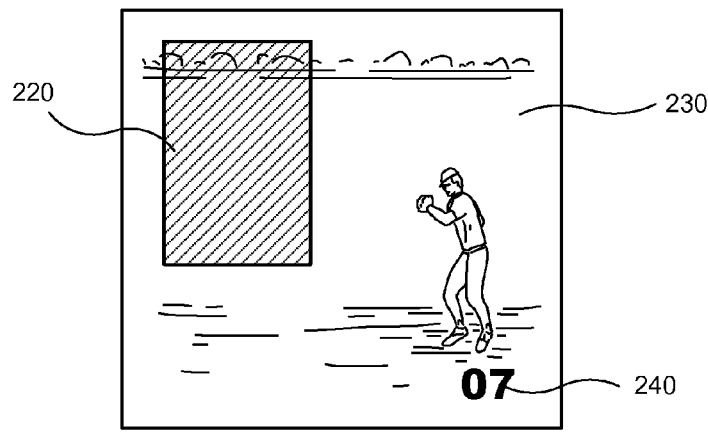
FIG. 3
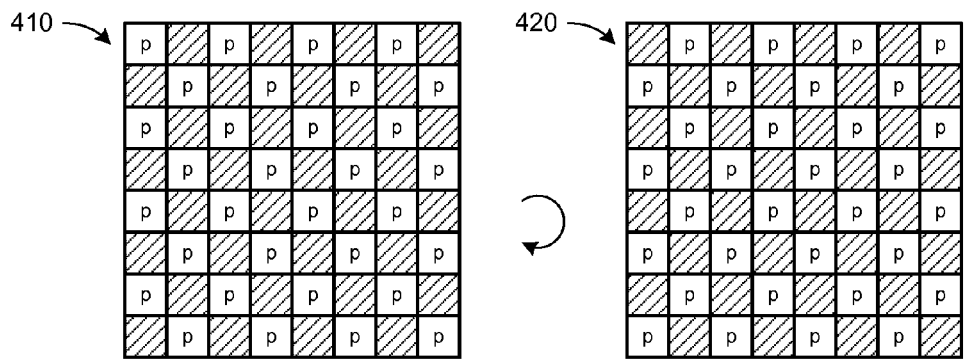
FIG. 4
FIG. 5
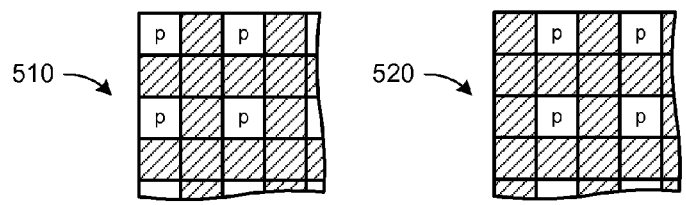
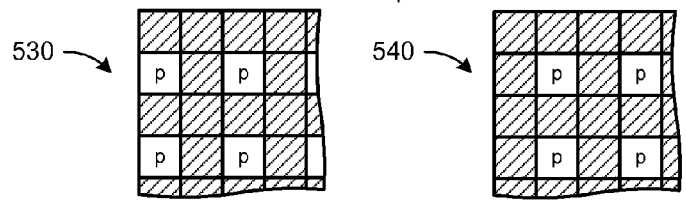

VIDEO BLENDING USING TIME-AVERAGED COLOR KEYS

BACKGROUND

This invention relates generally to digital graphics, and in particular to blending of graphics with a video overlay to achieve effects such as partial transparency and/or anti-aliasing.

The combination of graphics and video overlays is used in a wide variety of display systems. For example, while a television system receives and displays a broadcast program, the television system may also display graphics such as channel information and other menus or controls on the screen. The television system generates these graphics and then combines them with the broadcast program for display at the same time. Computing devices, such as computer systems and mobile phones, may also combine graphics and video overlays. For example, a computing device may display a streaming video on the device's display while also drawing graphics on the screen over the video, such as a cursor or menu.

One technique for combining graphics and video in a display system is called color keying (or chroma keying). In this technique, a particular color is defined as a color key. For each pixel in each frame, the display system will draw pixel from the graphics plane unless the color value of that pixel matches the color key, in which event the display system draws the corresponding pixel from the video overlay instead. Color keying is thus used to control which plane is visible, the graphics or the video overlay, on a per-pixel basis for each frame. In essence, the color key represents a fully transparent pixel in the graphics plane that allows the corresponding pixel in the video overlay plane to be seen.

In some applications, it is desirable to blend the graphics and video overlays so that the pixels drawn are a blend of the colors from each plane, rather than just being one or the other. Such an effect may be desirable, for example, to provide a partially transparent graphic (such as a menu) or to reduce aliasing of diagonal or round graphics against the video overlay. But traditional uses of color keys do not enable partially transparency of the graphics, since with color keying either the pixel from the graphics plane or the pixel from the video overlay plane is drawn. This binary nature of the pixels prevents partial transparency, and it may cause diagonal or round graphics to look jagged due to aliasing.

One technique for achieving partial transparency is known as alpha blending. In this technique, the pixel drawn on the display is a weighted average of the corresponding pixels from graphics and video overlays. For example, the following equation may be used to compute each channel of the pixel color, where the ratio $\alpha$ controls the blending between the graphics and video layers: final_pixel=graphics_pixel $(1-\alpha)$+video_pixel $(\alpha)$. This computation is performed for each pixel of each rendered frame. Although alpha blending enables a high level of blending control, this technique is computationally expensive and not always possible.

What are needed are techniques that enable transparency and/or reduce aliasing in a display system for graphics and video overlay using color keys.

SUMMARY

A display system combines a graphic plane and a video overlay plane using color keys in the graphics plane. By time-averaging patterns of color keys in successive frames of the graphics plane, individual pixels of the graphics plane can be made to appear partially transparent. For example, the display system may use time varying color key patterns over the graphics plane, causing the graphics and video to be averaged over time. This generates an impression similar to that of alpha blending between the graphics and video overlay, without requiring the use of alpha blending. The amount of blending between the graphic and video overlay planes may be controlled by using more or fewer color keys averaged across multiple video frames.

Embodiments of the invention may be used to draw portions of a graphic plane that appear partially transparent with respect to the video overlay plane. This effect may be achieved, for example, by applying one or more dither patterns of color keys to the desired portion of the graphics plane, and then cycling through the patterns for successive video frames. In other embodiments, the color key may be selectively applied to make individual pixels in the graphics plane partially transparent. In this way, anti-aliasing can be achieved by blending individual pixels near the edges of graphics in the graphics plane with the video plane.

The computing resources needed to support embodiments of the invention can be much lower than those required for software-based alpha blending of the graphics and video overlay planes. Moreover, using regular dither patterns and pre-rendering only the affected area, CPU cycles can be kept relatively low.

BRIEF DESCRIPTION OF THE DRAWINGS

FIG. 3 illustrates a video frame resulting from the combination of the graphics and video overlay planes of FIG. 2, in accordance with an embodiment of the invention.

FIG. 4 illustrates a set of dither patterns for color keys of a graphics plane for achieving 50% transparency, in accordance with an embodiment of the invention.

FIG. 5 illustrates a set of dither patterns for color keys of a graphics plane for achieving 25% transparency, in accordance with an embodiment of the invention.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
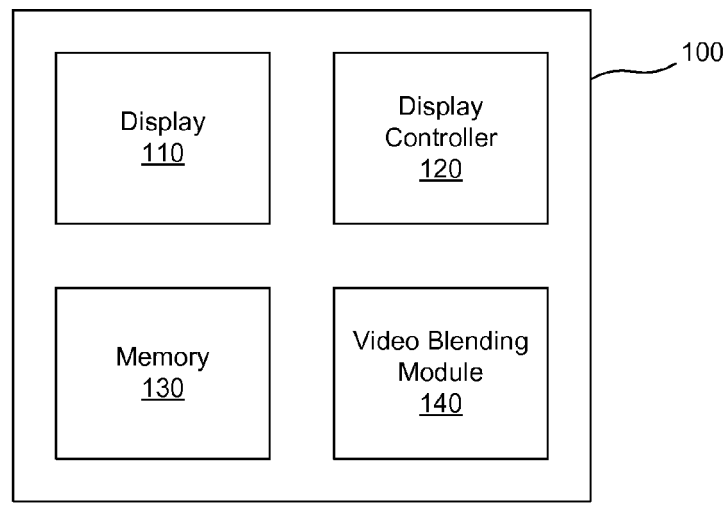
FIG. 1 is a schematic of a display system, in accordance with an embodiment of the invention.

FIG. 1 illustrates an embodiment of a display system 100, which comprises a display 110, a display controller 120, a memory 130, and a video blending module 140. The display system 100 may be part of including without limitation a television system, a cellular phone, a portable computing device, or any other type of system that enables viewing of video. In various types of systems and configuration, the display 110, the display controller 120, and the memory 130 may be any of a variety of components that are well known in the art for their corresponding functions. The video blending module 140, by which embodiments of the invention are enabled, may be implemented as software, hardware, or any combination thereof.

Figure 2:
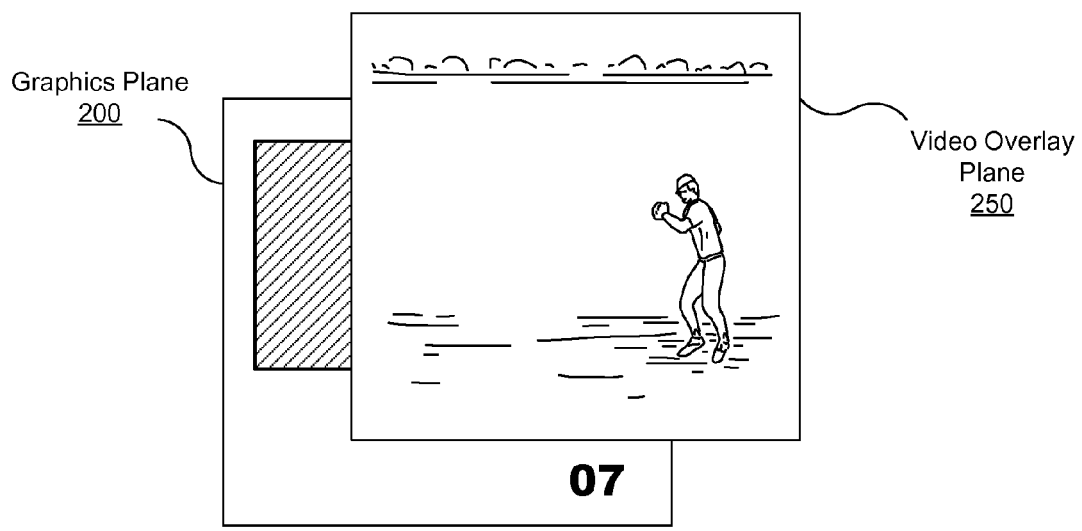
FIG. 2 illustrates a graphics plane and a video overlay plane, in accordance with an embodiment of the invention.

In video systems, graphics and video streams are often combined in a series of video frames, where each video frame is a combination of a graphics plane 200 and a video overlay plane 250, as illustrated in the example of FIG. 2. A frame in the graphics plane 200 may comprise graphics generated locally by a graphics module (not shown) in the display system 100, stored temporarily in the memory 130, or received from an external source. Similarly, a frame of the video overlay plane 250 may comprise frames from a video stream received from an external source (e.g., in the case of a television broadcast program), or an internal sources (e.g., in the case of a file stored in the memory 130 and decoded by a processor).

In one embodiment, to generate a video frame for the display system 100, the video blending module 140 combines a graphics plane 200 and a video overlay plane 250 using color keys in the graphics plane. This process is known as color keying or chroma keying. In this process, a particular color (or range of colors) is defined as a color key. For example, a pure, bright purple (e.g., in an RGB system, defined as: (255 0 255)) may be defined as the color key, as the color is less likely to be used in the graphics than other colors. For each pixel in each video frame to be rendered, the video blending module 140 draws the pixel from the graphics plane 200 unless the color value of that pixel matches the color key. If the pixel does match the color key, the video blending module 140 draws the corresponding pixel from the video overlay plane 250 instead. This allows the video overlay and the graphics to be blended using the color key to pass through the video overlay in portions of the display as desired. If only video overlay and no graphics are desired, the graphics plane 200 can be configured with every pixel therein set to the color key.

In an embodiment of the invention, to enable partial transparency of selected pixels and/or selected areas on the screen, the video blending module 140 is configured to perform time-averaging of color keys in successive frames of the graphics plane 200. In this way, a selected region in the graphics plane 200 (e.g., a menu) can be partially transparent with respect to corresponding regions of the video overlay plane 250. FIG. 3 illustrates an example of a combination of the graphics plane 200 and the video overlay plane 250 that are shown in FIG. 2. In the resulting video frame, a graphic 220 (e.g., a menu) is displayed as partially transparent with respect to the video frame 230. In addition, aliasing of graphics in the graphics plane 200 can be reduced by making selected pixels in the graphics plane 200 partially transparent. The anti-aliasing effect may be achieved by making partially transparent selected pixels near the borders of another graphic 240 (e.g., text that indicates a current channel). Specific embodiments of these techniques are described in more detail below.

A graphic in the graphics plane 200 (such as menu 220 in FIG. 3) can be made to appear partially transparent with respect to the content of the video overlay plane 250, in one embodiment, by applying a time-averaged dither pattern of color keyed pixels to the area of the graphics plane 200 that is desired to be partially transparent.

FIG. 4 illustrates an example of a set of dither patterns for achieving a 50% transparency of an area of the graphics plane 200. A first dither pattern 410 includes the color key value (such as purple, indicated with a "p" in the pixel box) for every other pixel, while a second dither pattern 420 is the opposite of the first pattern 410. When applied to a portion of the graphics plane, each of these patterns 410 and 420 has the effect of reassigning the color of every other pixel from the original graphics on the graphics plane 200 with that of the color key value. Each pattern 410 and 420 thus allows half of the pixels from the video overlay plane 250 to be displayed through the content of the graphics plane 200. The patterns 410 and 420 are then applied in an alternating fashion to successive frames of the graphics plane 200, which creates a more pleasing partial transparency effect and avoid aliasing and other artifacts. The dither patterns 410 and 420 may be applied to a portion of or the entire graphics plane 200, depending on the desired effect.

Other levels of blending can be achieved with different dither patterns and/or different timings of application of the patterns. For example, FIG. 5 illustrates a set of dither patterns, 510, 520, 530, and 540, where a particular pixel in each 2×2 set of pixels is assigned the value of the color key. By alternating among these four dither patterns, a time-averaged 25% transparency effect can be achieved. It can be appreciated that a 75% transparency can be achieved by revering the pixels that are assigned the color key value in patterns 510, 520, 530, and 540. A variety of other transparency levels may be achieved using other combinations of patterns. In addition to these regular dither patterns, other randomized or pseudo-randomized dither patterns of color keys, including randomized Floyd-Steinberg dither patterns, may be used in embodiments of the display system.

The number of patterns that can be used may depend in practical applications on the video frame rate (or refresh rate) of the system and the minimum allowable cycle rate of the patterns. The following table presents the transparency achieved and the cycle rate of the patterns for an example display system that has a 70 Hz frame rate.

| Transparency | Cycle Rate |
| --- | --- |
| 100% | 70 Hz |
| 75% | 17.5 Hz |
| 50% | 35 Hz |
| 25% | 17.5 Hz |
| 0% | 70 Hz |

For 100% transparency the graphics plane contains all color keys, and for 0% transparency the graphics plane contains none. Therefore, the cycle rate is the full video frame rate of 70 Hz (i.e., there are no alternating patterns). For a 50% transparency, such as in FIG. 4, two patterns are used. Thus, the full cycle of patterns occurs at 35 Hz. For 25% or 75% transparencies, as shown in FIG. 5, four patterns are used, so the cycle of patterns repeats at 17.5 Hz. These values are merely presented as examples, and other transparencies and rates are possible. For example, if a cycle rate of 7 Hz is acceptable, the system can achieve a 10% transparency, or any multiple thereof.

In one embodiment, the display system 100 renders multiple versions of a graphic (such as the menu 220 in FIG. 3) or multiple versions of an entire graphics plane 200. To render each version, the display system 100 applies a different dither pattern of color keys, as described above, producing multiple graphics that can be cycled through to achieve the time-averaged partial transparency effect. Accordingly, when combining the graphics plane 200 and video overlay plane 250 to produce successive frames of video, the display system 100 cycles through each of these pre-rendered graphics. This creates a time-averaging of the dither patterns, resulting in a partial transparent effect of the graphics in the resulting video stream.

Figure 6:
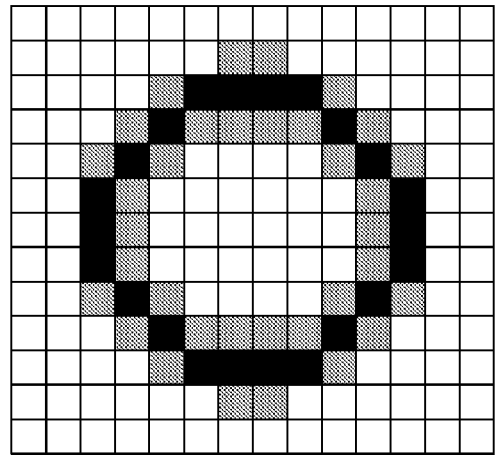
FIG. 6 illustrates an image of a graphic using grayscale to avoid aliasing.

Another embodiment of the invention is used to avoid aliasing of a graphic displayed against a video overlay, such as the textual graphic 240 shown in FIG. 3. Aliasing can occur when a curved or diagonal image is displayed against a contrasting color, causing noticeable abrupt steps in the image to be seen against the background color. One technique to avoid aliasing in this context is to blend the colors between the graphic and its background at pixels near the edge of the graphic. An example of this is illustrated in FIG. 6, where a graphic (e.g., a circle, or the letter "o") is black against a white background, and pixels near the edges of the graphic are gray. The grayed pixels help to reduce the aliasing effect of the black discrete pixels against the white background. But the traditional technique of blending the colors of the graphic and the background at pixels near the edge of the image cannot work in a video blending system if the system does not know the content of the video overlay when rendering the graphics plane. And even if the video overlay is known, this blending might require an alpha-blending technique, which may be undesirable.

Figure 7:
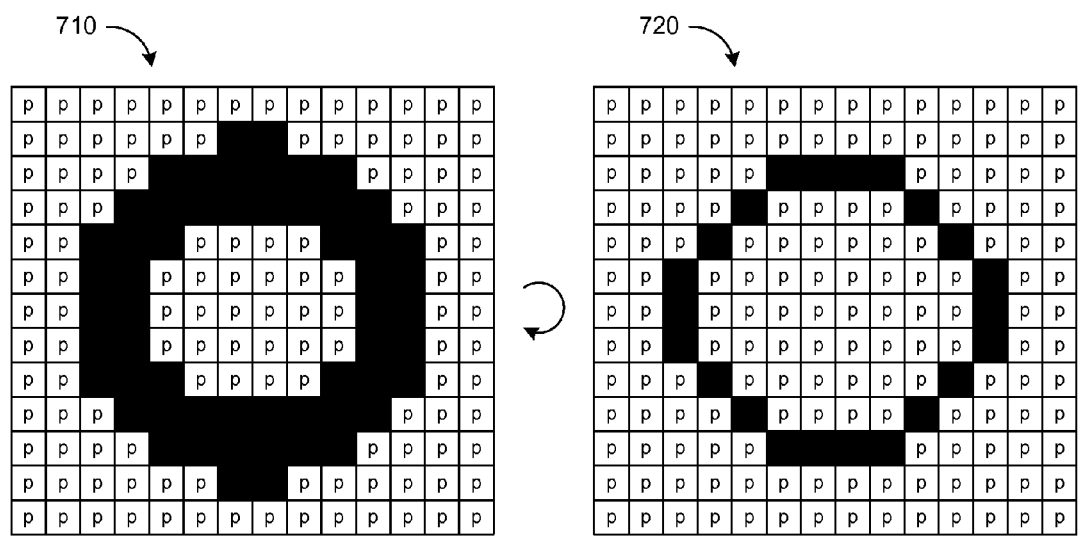
FIG. 7 illustrates a set of graphics planes for performing anti-aliasing using time-averaged video blending, in accordance with an embodiment of the invention.

To address the aliasing issue, an embodiment of the invention uses time-averaged blending of pixels near an edge of a graphic rather than blending in the color domain. FIG. 7 illustrates a pair of patterns 710 and 720 of a graphics plane that correspond to the graphic shown in FIG. 6. The blending effect of the grayed pixels in FIG. 6 can be achieved in the time domain by alternating between graphics planes in which these pixels are present (i.e., black) in one video frame and then not present (i.e., assigned to the color key) in another video frame. By alternating these patterns 710 and 720 when combining a graphics plane with the video overlay plane to achieve each video frame, the pixels near the edge of the graphic will have a time-averaged blending between the graphic in the graphics plane and the content of the video overlay plane.

The use of the two patterns 710 and 720 in an alternating fashion achieves a 50% blending effect, corresponding to a 50% gray pixel used for a black graphic on a white background. To achieve other amounts of blending, for more complex anti-aliasing schemes, additional patterns can be used, and/or timings other than alternating the patterns 710 and 720 can be used. For example, to achieve a lower amount of blending for these edge pixels, such as 33% blending (e.g., similar to the use of a 33% gray pixel), the pattern 720 could be used in two video frames for each use of pattern 710 in a video frame. Any number of patterns and timings are possible, although video frame rates and minimum acceptable cycle rates may limit the quality of the resulting video stream.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for video blending of graphics and video content for a display system, the method comprising:
   rendering one or more graphics items for display with the video content;
   generating a series of graphics frames containing the rendered one or more graphics items, the series of graphics frames comprising;
      a first graphics frame with a first dither pattern of color keyed pixels applied to it, wherein the first dither pattern assigns a first set of pixels in the first graphics frame a color value equal to a color key; and
      a second graphics frame with a second dither pattern of color keyed pixels applied to it, wherein the second dither pattern assigns a second set of pixels in the second graphics frame a color value equal to the color key, wherein the first set of pixels is different from the second set of pixels;
   receiving the video content as a series of video overlay frames;
   generating, with a hardware processor, a series of video frames comprising a time-averaged blending of the one or more graphics items and the video content by combining each video overlay frame of the series of video overlay frames with one of the first graphics frame and second graphics frame in alternating fashion between the first graphics frame and the second graphics frame to create a time-averaged partial transparency effect of the one or more graphics items with respect to the video content; and outputting the series of video frames for display on the display system.

2. The method of claim 1, wherein each of the generated series of graphics frames includes an area containing the rendered one or more graphics items and at least one of the first dither pattern and second dither pattern, thereby producing a partial transparency of the one or more graphics items in the generated series of video frames.

3. The method of claim 1, wherein each of the first dither pattern and second dither pattern is a randomized Floyd-Steinberg dither pattern.

4. The method of claim 1, wherein a plurality of pixels near an edge of a graphics item have a color value equal to the color key in one or more of the graphics frames and a color value not equal to the color key in one or more of the graphics frames, thereby reducing aliasing around the graphics object.

5. The method of claim 1, wherein the series of graphics frames comprises a sequence of three or more graphics frames.

6. The method of claim 1, wherein the series of graphics frames comprises a sequence of graphics frames containing at least two instances of a particular graphics frame.

7. A method for rendering a video stream including graphics and a video overlay, the method comprising:

generating a plurality of dither patterns of color keyed pixels, the plurality of dither patterns comprising a first dither pattern and a second dither pattern;

assigning, with a hardware processor, the plurality of dither patterns to successive graphics frames in a repeating sequence so that the first dither pattern is assigned to a first graphics frame and the second dither pattern is assigned to a second graphics frame, wherein the plurality of dither patterns define locations of pixels that are assigned the color value of a color key on the graphics frames to which the plurality of dither patterns are assigned; and drawing each video frame to comprise a time-averaged blending of one or more graphics items rendered in the successive graphics frames and the video overlay by combining a video overlay frame with a graphics frame from the successive graphics frames in alternating fashion between each of the successive graphics frames to create a time-averaged partial transparency effect of the one or more graphics items with respect to the video overlay.

8. A non-transitory computer-readable medium containing computer program code for performing the method comprising:

rendering one or more graphics items for display with the video content;

generating a series of graphics frames containing the rendered one or more graphics items, the series of graphics frames comprising;

a first graphics frame with a first dither pattern of color keyed pixels applied to it, wherein the first dither pattern assigns a first set of pixels in the first graphics frame a color value equal to a color key; and a second graphics frame with a second dither pattern of color keyed pixels applied to it, wherein the second dither pattern assigns a second set of pixels in the second graphics frame a color value equal to the color key, wherein the first set of pixels is different from the second set of pixels;

receiving the video content as a series of video overlay frames;

generating, with a processor, a series of video frames comprising a time-averaged blending of the one or more graphics items and the video content by combining each video overlay frame of the series of video overlay frames with one of the first graphics frame and second graphics frame in alternating fashion between the first graphics frame and the second graphics frame to create a time-averaged partial transparency effect of the one or more graphics items with respect to the video content; and outputting the series of video frames for display on a display system.

9. The computer-readable medium of claim 8, wherein each of the generated series of graphics frames includes an area containing the rendered one or more graphics items and at least one of the first dither pattern and second dither pattern, thereby producing a partial transparency of the one or more graphics items in the generated series of video frames.

10. The computer-readable medium of claim 8, wherein each of the first dither pattern and second dither pattern is a randomized Floyd-Steinberg dither pattern.

11. The computer-readable medium of claim 8, wherein a plurality of pixels near an edge of a graphics item have a color value equal to the color key in one or more of the graphics frames and a color value not equal to the color key in one or more of the graphics frames, thereby reducing aliasing around the graphics object.

12. The computer-readable medium of claim 8, wherein the series of graphics frames comprises a sequence of three or more graphics frames.

13. The computer-readable medium of claim 8, wherein the series of graphics frames comprises a sequence of graphics frames containing at least two instances of a particular graphics frame.

14. A display system comprising:

a display screen;
a memory;
a processor;
a display controller coupled to the display screen for controlling video frames reproduced on the display screen; and
a video blending module stored in the memory, the video blending module configured to cause the processor to:
render one or more graphics items for display with content from a video overlay,
generate a series of graphics frames containing the rendered one or more graphics items, the series of graphics frames comprising:
a first graphics frame with a first dither pattern of color keyed pixels applied to it, wherein the first dither pattern assigns a first set of pixels in the first graphics frame a color value equal to a color key; and
a second graphics frame with a second dither pattern of color keyed pixels applied to it, wherein the second dither pattern assigns a second set of pixels in the second graphics frame a color value equal to the color key, wherein the first set of pixels is different from the second set of pixels;
receive the video overlay content as a series of video overlay frames;
generate a series of video frames comprising a time-averaged blending of the one or more graphics items and the video content by combining each video overlay frame of the series of video overlay frames with one of the first graphics frame and second graphics frame in alternating fashion between the first graphics frame and the second graphics frame to create a time-averaged partial transparency effect of the one or more graphics items with respect to the video content;

output the series of video frames to the display controller for reproduction on the display screen.

15. The display system of claim 14, wherein the video blending module is configured to generate a series of graphics frames that include an area containing the rendered one or more graphics items and at least one of the first dither pattern and second dither pattern, thereby producing a partial transparency of the one or more graphics items in the generated series of video frames.

16. The display system of claim 14, wherein the video blending module is configured to generate graphics frames in which a plurality of pixels near an edge of a graphics item have a color value equal to the color key in one or more of the graphics frames and a color value not equal to the color key in one or more of the graphics frames, thereby reducing aliasing around the graphics object.

* * * * *